United States Patent [19]
Anderson, III et al.

[11] Patent Number: 4,463,610
[45] Date of Patent: Aug. 7, 1984

[54] TUNED VIBRATION DETECTOR

[75] Inventors: Philip M. Anderson, III, Chatham, N.J.; Donald Raskin, New York, N.Y.; Ronald K. Reich, Phillipsburg, N.J.

[73] Assignee: Allied Corporation, Morris Township, Morris County, N.J.

[21] Appl. No.: 349,739

[22] Filed: Feb. 18, 1982

[51] Int. Cl.³ .................. G01L 23/22; G01H 1/00
[52] U.S. Cl. ............................. 73/654; 73/35; 73/651
[58] Field of Search ................ 73/35, 651, 654; 310/26

[56] References Cited

U.S. PATENT DOCUMENTS

| | | | |
|---|---|---|---|
| 2,424,864 | 7/1947 | Treseder | 73/651 |
| 4,096,735 | 6/1978 | Huntzinger et al. | 73/35 |
| 4,161,665 | 7/1979 | Buck et al. | 310/26 |
| 4,254,354 | 3/1981 | Keem | 73/35 X |
| 4,307,602 | 12/1981 | Sawada et al. | 73/35 |
| 4,383,434 | 5/1983 | Hamisch et al. | 73/651 X |

OTHER PUBLICATIONS

"Force and Displacement Transducers . . . ", by Mohri et al. from Electrical Engineering in Japan, vol. 99, No. 2, Jan.-Feb. 1979, pp. 105-112.

Primary Examiner—James J. Gill
Attorney, Agent, or Firm—Ernest D. Buff; Paul Yee; Gerhard H. Fuchs

[57] ABSTRACT

This invention comprises a vibration sensor for detecting engine knock. The sensor has a tuning mechanism which is mechanically resonant with a preselected vibrational frequency. The resonating movements of this tuning mechanism are adapted to apply varying stress to an associated magnetostrictive element. A magnetic biasing element imparts a magnetization to the magnetostrictive element and a detecting means is associated with the magnetostrictive element for detecting changes in the magnetization caused by the varying applied stress.

19 Claims, 5 Drawing Figures

TUNED VIBRATION DETECTOR

DESCRIPTION

BACKGROUND OF THE INVENTION

1. Field of the Invention

This invention relates to vibration sensors and, more particularly to sensors for detecting fuel detonation ("knock") in an internal combustion engine.

2. Description of the Prior Art

It is well known that fuel within the combustion chambers of gasoline internal combustion engines should burn without detonation. The sound of the detonation, known as engine knock, is annoying and the higher cylinder pressures associated therewith can damage the engine. Systems employed to eliminate engine knock generally have means that detect the occurence of the knock and then automatically adjust the ignition spark timing. Knock detecting means used in these systems have transducers composed either of piezoelectric material or magnetostrictive material.

Knock detector devices using piezoelectric transducers are expensive because they use crystals or ceramics that must be specially manufactured and prepared to obtain proper operation. Furthermore, piezoelectric devices are charge type devices having high internal impedance. There can be significant attenuation of the output signal within even a short length of leadout wiring, and it is necessary to locate a signal amplifier having low input impedance near to the piezoelectric device. The need for such preamplification, in turn, raises the cost of the knock detection system. In addition, piezoelectric materials are brittle. They crack easily when subject to compressive stresses and are not readily constructed using clamping type devices. Instead, they must be adhesively bonded to a metal substrate to provide structural reinforcement and avoid breakage. The adhesives in turn can be heat sensitive and can experience aging problems.

Knock detector devices using magnetostrictive transducers employ crystalline metal alloys which require special annealing procedures and which even then have low magnetomechanical coupling (MMC) factors (in the order of 0.25). Thus, more transducer material is needed to produce a given output signal. Such transducer materials are usually soft mechanically. They are easily scratched and deformed, and crystalline metal magnetostrictive transducer materials having higher MMC factors are expensive and brittle. As a result, there can be undesirable limitations on how these materials are handled during manufacturing operations. In addition, a high magnetic bias field in the order of 300 oersteds is needed for proper operation of present devices. This requires the use of more expensive and powerful magnets to impart the levels magnetization needed for these materials, and if electromagnets are used to provide this magnetic bias, those electromagnets will require more electrical power and can cause heat dissipation problems. Furthermore, crystalline metal alloys employed as magnetostrictive transducers are negative magnetostriction alloys and require substantial amounts of material to support the compressive loads to which they must be subjected during operation. Mechanical structures needed to provide those compressive loads are not easily changed to make the structures mechanically resonant with the different vibrational knock frequencies that are characteristic of different engine models. Since each engine model can have a different vibrational frequency characteristic of knock, many different knock detectors must be specifically manufactured and inventoried to ensure that a matched detector, tuned to resonate at the characteristic frequency, is available for each particular engine model. For these reasons, knock detectors of the type described above have more complex and expensive structures or provide output signals of lower strength than are desireable.

SUMMARY OF THE INVENTION

The present invention provides a low cost, sensitive, and versatile vibration sensor for detecting vibration having a preselected frequency. One type of vibration subject to detection by the sensor of the invention is that produced by engine knock. The sensor has a tuning means that is mechanically resonant with a preselected vibrational frequency. The resonating movements of this tuning means apply varying stress to a glassy metal magnetostrictive element associated therewith. A magnetic biasing means imparts a magnetization to the magnetostrictive element, and a detecting means associated with the magnetostrictive element detects changes in that magnetization caused by the varying applied stress. In a preferred embodiment, the stress applied to the magnetostrictive element is tensile.

The vibration detector of this invention has many advantageous features. It is capable of applying tensile stress and can be adapted for use with positive magnetostriction materials such as glassy metal alloys. Since the detector is capable of using these glassy metal alloys, it requires less magnetostrictive material, it has higher sensitivity with an output signal that can be readily processed without preamplification, and it avoids the use of costly piezoelectric materials. The detector is readily turnable to different preselected vibrational frequencies, with the result that it can be adapted for use with other apparatus such as motors, turbines, transformers, capacitors and the like, where a failure or particular operating condition is evidenced by a characteristic vibrational frequency.

BRIEF DESCRIPTION OF THE DRAWINGS

The invention will be more fully understood and further advantages will become apparent when reference is made to the following detailed description and the accompanying drawings in which.

DESCRIPTION OF PREFERRED EMBODIMENTS

Figure 1:
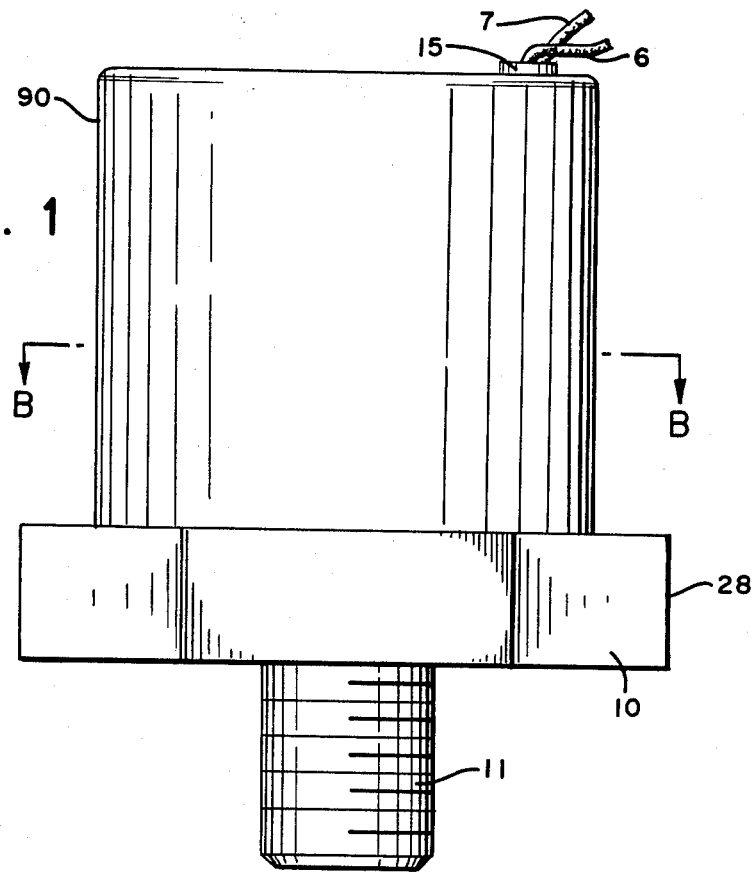
FIG. 1 is a side plan view of the vibration sensor.

The vibration sensor of this invention may be used in a variety of applications where a failure or particular operating condition is evidenced by a characteristic vibrational frequency. For example, certain failures in rotating machinery, such as motors or turbines, and certain failures in electrical apparatus, such as transformers and capacitors, have characteristic vibrational frequencies. While the particular embodiment of the invention shown and described is adapted for use with an internal combustion engine to detect vibrations characteristic of engine knock, it is readily apparent that the invention is suitable for other applications as well; all of which are within the scope of this invention.

Referring to FIGS. 1, 2, 3 and 4 of the drawings, there is illustrated a preferred embodiment of a knock vibration detector, shown generally at 9. Detector 9 has a tuning means 1 mechanically resonant with a preselected frequency to be detected. A magnetostrictive element of glassy metal, shown as ribbon 4, is connected to tuning means 1 by suitable fastening means to undergo varying stress applied by the resonating vibrational movements of tuning means 1. A magnetic biasing means, shown as magnet 5, imparts a magnetization to ribbon 4, and a detecting means 3 detects changes in the magnetization of ribbon 4 caused by the varying applied stress. Detector 9 has a base 10 provided with a hexagonally shaped outer peripheral surface 28 adapted for engagement by a standard wrench. Base 10 includes a threaded stud 11 for attachment to a suitable location on an internal combustion engine, such as the block, exhaust manifold or the like, where knock induced vibrations are present.

Tuning means 1 is comprised of mechanically resonant frame 70, clamp 2 and screw 12. Frame 70 is comprised of a horizontal bottom element 22 attached to base 10 by a suitable fastening means such as welding, a vertical support element 23, and a horizontal cantilevered arm element 21. Support element 23 is disposed at one end of bottom element 22 and is oriented approximately perpendicular to bottom element 22. Cantilevered arm element 21 is positioned at the top end of support element 23 and is approximately perpendicular to support element 23. Thus, frame 70 is roughly shaped like an angular letter "C". The materials and dimensions of frame 70 are selected to tune frame 70 to a preselected, vibrational resonant frequency. Since an internal combustion engines has a characteristic knock induced vibrational frequency of approximately 5 to 8 kilohertz, frame 70 is made of a metal adapted to resonate at the characteristic frequency, such as brass. Changing the mass of cantilevered element 21, such as by changing the mass of attachable clamp 2, provides a simple means for varying the mechanical resonant frequency of frame 70. Thus, when manufacturing a family of knock detectors tuned to different characteristic frequencies, only one simple part need be changed. This allows a commonality and interchangeability of parts important to minimizing manufacturing costs.

Magnetostrictive ribbon 4 is attached to bottom element 22 with a fastening means such as weld 13. If ribbon 4 is a positive magnetostriction material, approximately 1000 grams of tensile force is applied to prestress ribbon 4 before attaching it to cantilevered element 21 with clamp 2 and screw 12. Although a prestress is not essential for operation, it prevents undesired buckling and twisting of ribbon 4 and helps to optimize the sensitivity of the device. Preferably ribbon 4 is disposed perpendicular to cantilevered element 21 such that ribbon 4 lies substantially collinear with the vertical, resonating movements of the attached end of cantilevered element 21. This orientation most effectively uses the resonating movement of frame 70, and more particularly the resonating movements of cantilever element 21, to apply stress to ribbon 4. It is possible to use other orientations for ribbon 10 or even laminate ribbon 4 to cantilever element 21. However, such arrangements of elements degrade the performance of the sensor. If ribbon 4 is negative magnetostriction material, frame 70 is easily adapted to maintain a level of compressive prestress in ribbon 4; the desired level of compressive stress is applied to ribbon 4 before it is secured to cantilevered element 21 by clamp 2 and screw 12. However, ribbon 4 must be reinforced or be constructed of a bulk material such as a rod or laminated sheet layers in order to prevent undesired buckling.

Amorphous, glassy metals are particularly suited for constructing ribbon 4. Such metal is prepared by cooling a melt of the desired composition at a rate of at least about $10^5$°C./sec, employing metal alloy quenching techniques well-known to the glassy metal alloy art; see, e.g., U.S. Pat. No. 3,856,513 to Chen et al. The purity of all compositions is that found in normal commerical practice.

A variety of techniques are available for fabricating continuous ribbon, wire, sheet, etc. Typically, a particular composition is selected, powders or granules of the requisite elements in the desired portions are melted and homogenized, and the molten alloy is rapidly quenched on a chill surface, such as a rapidly rotating metal cylinder.

Under these quenching conditions, a metastable, homogeneous, ductile material is obtained. The metastable material may be glassy, in which case there is no long-range order. X-ray diffraction patterns of glassy metal alloys show only a diffuse halo, similar to that observed for inorganic oxide glasses. Such glassy alloys must be at least 50% glassy to be sufficiently ductile to permit subsequent handling, such as stamping complex shapes from ribbons of the alloys, without degradation of the MMC factor. Preferably, the glassy metal marker must be at least 80% glassy to attain superior ductility. The metastable phase may also be a solid solution to the constituent elements. In the case of the element of the invention, such metastable, solid solution phases are not ordinarily produced under conventional processing techniques employed in the art of fabricating crystalline alloys. X-ray diffraction patterns of the solid solution alloys show the sharp diffraction peaks characteristic of crystalline alloys, with some broadening of the peaks due to desired fine-grained size of crystallites. Such metastable materials are also ductile when produced under the conditions described above.

Magnetostrictive metallic glasses which can be used with the invention have a composition essentially of the formula $M_a N_b O_c X_d Y_e Z_f$, where M is at least one of iron and cobalt, N is nickel, O is at least one of chromium and molybdenum, X is at least one of boron and phosphorous, Y is silicon, Z is carbon, "a"-"f" are in atom percent, "a" ranges from about 35-85, "b" ranges from about 0-45, "c" ranges from about 0-7, "d" ranges from about 5-22, "e" ranges from about 0-15 and "f" ranges from about 0-2, and the sum of $d+e+f$ ranges from about 15-25.

These materials have magneto-mechanical coupling (MMC) factors of 0.4 in their as cast state. If these glassy metals are specially annealed, the MMC factors can be as high as 0.95. Consequently, such glassy metal magnetostrictive materials can efficiently convert knock induced vibrational energy into electromagnetic energy. Glassy metals are also harder and stronger than magnetostrictive materials made of crystalline metals and can withstand greater stress. Furthermore, glassy metal magnetostrictive materials can be produced which will exhibit positive magnetostriction. These glassy metals are responsive to applied tensile stress, and since they can function in the tensile mode, less material is needed; there is no need to support compressive loads which would cause the material to bend or buckle. In the embodiment shown, a thin ribbon of glassy metal 1.78 cm long, 0.5 cm wide, and 0.0038 cm thick is sufficient to produce a device which provides an output signal of over 1 volt when subjected to an input acceleration of 3.5 m/sec$^2$. More magnetostrictive material could be used to produce a device having a larger output signal or more sensitivity, if desired.

Magnet 5 is located in proximity to ribbon 4 to provide a magnetic bias to ribbon 4. Although a permanent magnet is shown in this embodiment, an electromagnet could be used or a magnetic remanence could be induced in ribbon 4. In any case, the magnetic field provided by magnet 5 should be approximately 100 oersteds. Magnet 5 is horseshoe shaped and oriented to optimize performance. In this embodiment, magnet 5 is disposed such that a line connecting the ends of the horseshoe lies substantially parallel to the transverse, width dimension of ribbon 4.

Detecting means 3 is comprised of coil 30 and bobbin 18. Bobbin 18 is fastened on top of bottom element 22 with a suitable fastening means such as an adhesive, and has a longitudinal slot 19 extending therethrough along its central axis. Slot 19 is sized and positioned to accommodate the placement and free passage of ribbon 4 therethrough. A coil 30 of electrically conductive material, such as wire, is wound around bobbin 18; approximately 6,000 turns of number 40 magnet wire are used in the embodiment shown. It is possible to optimize the performance of the knock sensor by tuning coil 30 to electronically resonate at the preselected knock frequency. This can be done by adding an external capacitance or by using the inherent internal capacitance of coil 30.

Damper 16 is a piece of resilient material, such as pipe dope, attached to frame 70 in order to broaden the bandwidth of the detector and provide sensitivity over a preselected range of frequencies. The characteristic frequency of knock induced vibrations can vary from engine to engine because of manufacturing tolerances. With the detector responsive to a bandwidth of vibrational frequencies, the matching of individual detectors to individual engines becomes less critical. Enclosure 90 which protects the operating elements of the sensor against the ambient environment, is a cylinder with an open end and a closed end. The open end is placed over the operating elements of the sensor enclosing them and is then attached to base 10 by a suitable means such as crimping. A wide choice of materials could be used for enclosure 90, such as metal or plastic, and a ferrous metal can be used to provide protection as well as some electromagnetic shielding against stray fields that might cause the knock detector device to produce extraneous output signals. In addition, another electromagnetic shield 8 made of high permeability material can be located inside of enclosure 90. Shield 8 can be constructed from a flat sheet of material which is loosely formed into a cylindrical shape and placed inside of enclosure 90. As it springs back and tries to return to its original flat shape, shield 8 forms a friction fit with the inside surface of enclosure 90. Enclosure 90 has a hole 14 extending through it, and installed within hole 14 is grommet 15 to accomodate the passage of coil signal output leads 6 and 7 therethrough. It is readily apparent that other means for communicating the signal output of coil 30 through enclosure 90 to appropriate processing electronics can be used. For example, one of the leads may be grounded to base 10 or electrical terminal means such as prongs, screws or sockets may be provided; all of which are within the scope of this invention.

The described knock detector operates in the following manner: When fuel detonation, or engine knock, occurs, it produces sonic vibrations of a characteristic frequency. The precise frequency of this sound depends on various factors, including the size and the geometry of the combustion chamber of the engine. These sound vibrations are conducted through the engine block and then through base 10 to frame 70. Frame 70 of the knock detector is tuned to mechanically resonate at a frequency selected to match the characteristic vibrational frequency caused by engine knock. As frame 70 resonates, cantilever element 21 develops a resonating movement similar to that observed in a tuning fork after it is struck. Ribbon 4 is attached between frame bottom element 22 and cantilevered arm 21, and the resonating movements of arm 21 apply a varying stress to ribbon 4. Since ribbon 4 is a magnetostrictive material, the varying applied stress causes the magnetic permeability of ribbon 4 to vary. Ribbon 4 is biased with an initial level of magnetization by magnet 5, and as the permeability of ribbon 4 changes, corresponding changes in this level of magnetization also occur. Since coil 30 is in close proximity to and effectively wound around ribbon 4, the changing magnetization within ribbon 4 induces a varying voltage in coil 30 in accordance with Faraday's Law. This induced voltage is routed to appropriate processing electronics through output wires 6 and 7.

Figure 2:
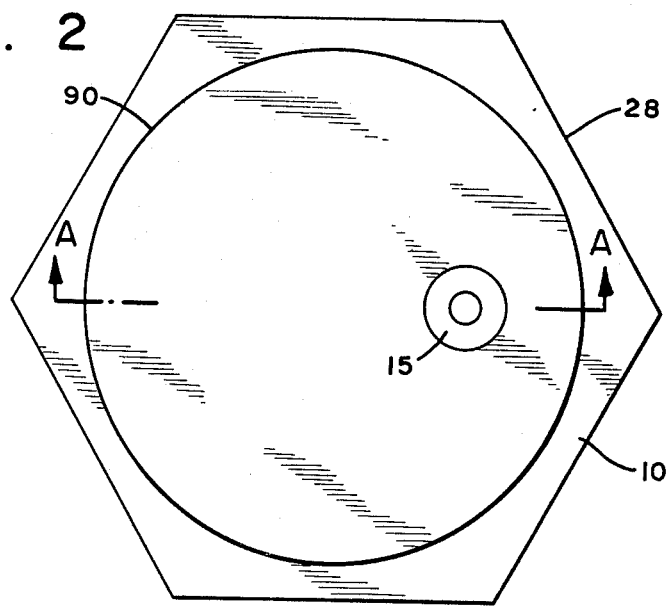
FIG. 2 is a top plan view of the vibration sensor.
Figure 3:
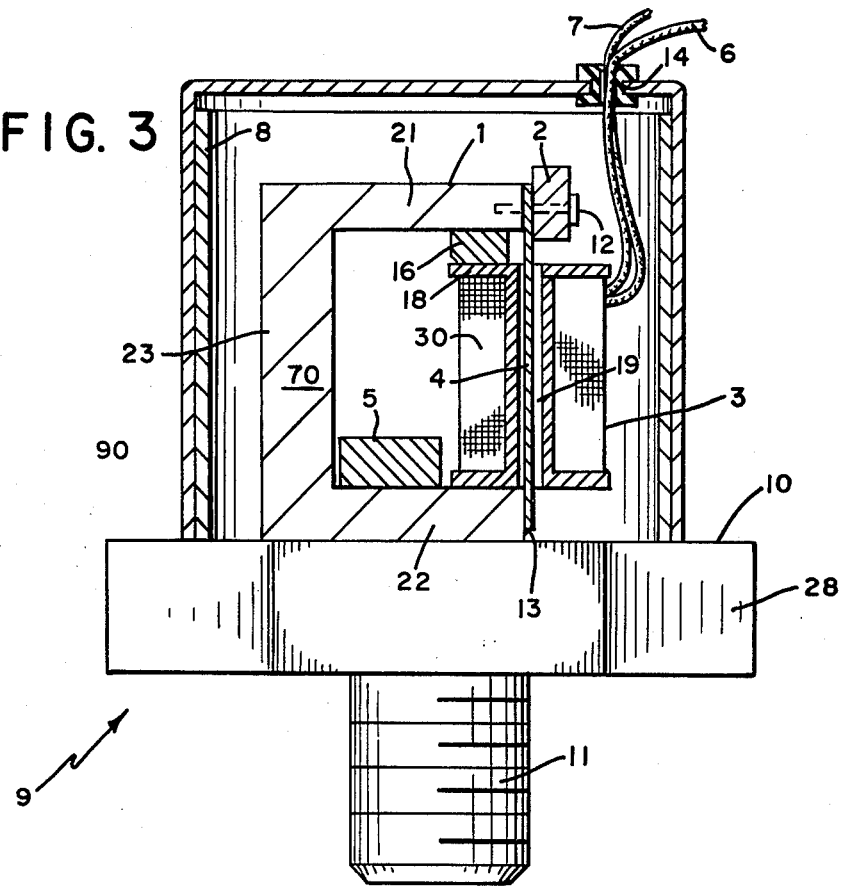
FIG. 3 is a longitudinal section taken along line A—A of FIG. 2.
Figure 4:
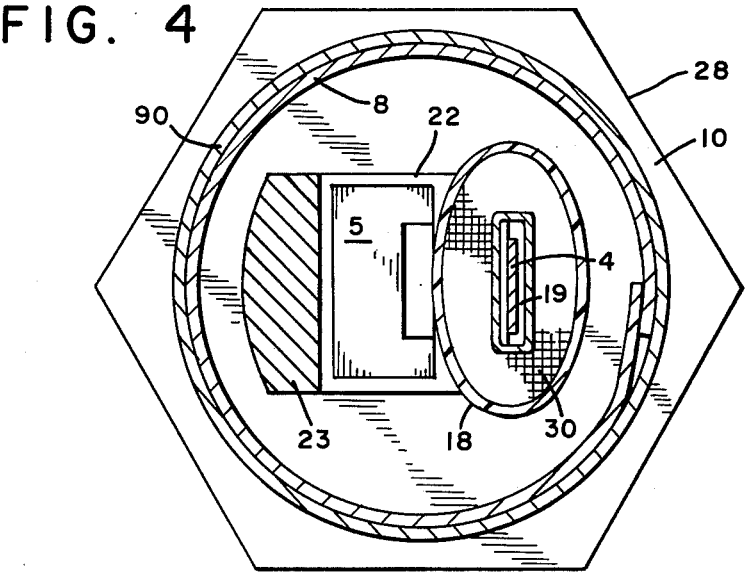
FIG. 4 is a lateral section taken along line B—B of FIG. 1.
Figure 5:
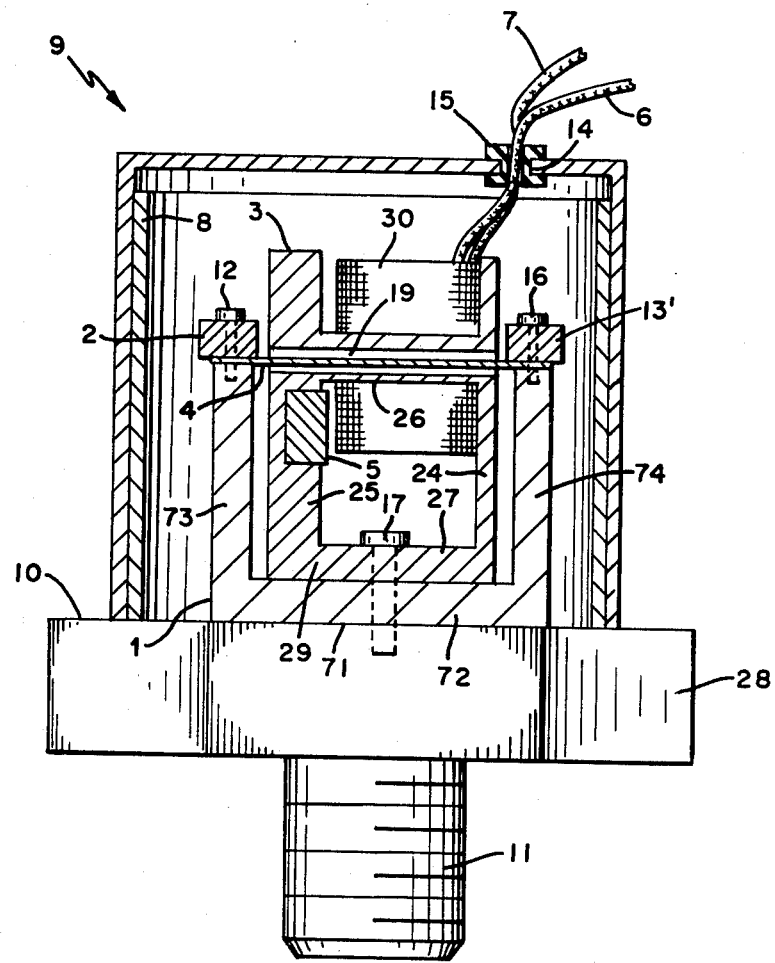
FIG. 5 is a longitudinal section of an alternate embodiment of the invention.

Referring to FIGS. 1, 2, and 5 of the drawings, there is illustrated a second embodiment of this invention. Frame 71 has a horizontal base portion 72, assembled to base 10 with assembly screw 17, and two vertical cantilevered elements 73 and 74. Cantilevered elements 73 and 74 are located at opposite ends of base portion 72 and positioned approximately prependicular to the base portion 72. Preferably cantilevered elements 73 and 74 are approximately of equal length. When viewing resonant frame 71, it forms the shape of an angular letter "U". The materials and dimensions of frame 71 are chosen to get mechanical resonance at a preselected frequency. Since engine knock produces a characteristic frequency of approximately 5 to 8 Kilohertz, frame 71 is made of a metal such as brass. With this embodiment of the knock sensor, it is possible to obtain a bandwidth of vibrational frequencies by tuning each cantilevered arm element to a slightly different resonant frequency. The tuning of individual cantilevered element 73 and 74 can be accomplished by changing the weight of clamp 2 or 13', respectively. A ribbon 4 of magnetostrictive material is attached between cantilevered elements 73 and 74. First, one end of ribbon 4 is attached to one cantilevered element 73 with clamp 2 and screw 12. If ribbon 4 is a positive magnetostriction material, a small tensile prestress of approximately 1000 grams force is applied to the second end of ribbon 4 before attaching it to cantilevered element 74 with clamp 13' and screw 16. This tensile stress prevents unwanted buckling and twisting of ribbon 4 during operation and helps to optimize the sensitivity of the sensor. If ribbon 4 is a negative magnetostriction material, one can apply a compressive prestress to ribbon 4 before clamping it to cantilevered element 74. However, if compressive stress is applied to ribbon 4, some additional reinforcement is necessary to prevent the ribbon from buckling or bending. Coil support 29 supports and positions pick up coil 30 and has a base portion 27 assembled to frame 71 and base 10 with screw 17. In addition, coil support 29 has two vertical upstanding support legs 24 and 25 of approximately equal length disposed at opposite ends of the base portion 27 and has a top bobbin portion 26 spanning the distance between the upper ends of support legs 24 and 25. A longitudinal slot 19 located through bobbin portion 26 is appropriately sized and positioned to accomodate the placement and free passage of ribbon 4 therethrough. Coil 30 is wound around bobbin portion 26 with approximately 6,000 turns of number 40 magnet wire and has output leads 6 and 7. Enclosure 90, which is disposed around the operative sensor elements to protect them from ambient environment, can be made of metal or plastic material. A ferrous metal can be used to provide some electromagnetic shielding. Additional electromagnetic shielding can be provided by a magnetic shield 8 made of an appropriate ferromagnetic material having high permeability.

This embodiment of the invention operates similarly to the previous embodiment except that two cantilevered elements, 73 and 74, can individually produce resonating movements to apply stress to ribbon 4. Specific advantages of this embodiment are that it can be simultaneously tuned to two different resonant frequencies and that it can provide a higher signal output because the simultaneous resonating movements of cantilevered elements 73 and 74 can apply larger stresses to ribbon 4.

Having thus described the invention in rather full detail, it will be understood that such details need not be strictly adhered to but that various changes and modifications may suggest themselves to one skilled in the art, all falling within the scope of the invention as defined by the subjoining claims.

We claim:

1. A vibration sensor to detect vibrations having a preselected frequency comprising:
   a. tuning means mechanically resonant with a preselected vibrational frequency to be detected, said tuning means comprising a frame having at least one mechanical resonant frequency and having at least one cantilevered element extending therefrom;
   b. a element of positive magnetostriction glassy metal, which is connected substantially perpendicular to said cantilevered element to undergo a varying tensile stress in response to vibrational movements of said cantilevered element and which is connected to said cantilevered element with a tensile prestress applied thereto;
   c. magnetic biasing means for imparting a magnetization to said magnetostrictive element; and
   d. means associated with said magnetostrictive element for detecting changes in the magnetization thereof due to the varying stress applied thereto.

2. A vibration sensor as recited in claim 1, wherein said tuning means comprises a frame having at least one mechanical resonant frequency and two cantilevered elements extending therefrom, and wherein said glassy metal magnetostrictive element is connected between said cantilevered elements to undergo varying stress applied thereto by the vibrational movement of said cantilevered elements.

3. A vibration sensor as recited in claim 1 wherein said sensor is adapted for use with an internal combustion engine to detect at least one characteristic vibrational frequency caused by engine knock.

4. A vibration sensor as recited in claim 1 wherein said tuning means further comprises means for varying the mechanical resonant frequency of said frame.

5. A vibration sensor as recited in claim 4 wherein said means for varying the mechanical resonant frequency of said frame is a preselected mass affixed to said cantilevered element of said frame.

6. A vibration sensor as recited in claim 1 wherein said glassy metal has a composition defined essentially by the formula $M_aN_bO_cX_dY_eZ_f$, where M is at least one of iron and cobalt, N is nickel, O is at least one of chromium and molybdenum, X is at least one of boron and phosphorous, Y is silicon, Z is carbon, "a"–"f" are in atom percent, "a" ranges from about 35–85, "b" ranges from about 0–45, "c" ranges from about 0–7, "d" ranges from about 5–22, "e" ranges from about 0–15 and "f" ranges from about 0–2, and the sum of d+e+f ranges from about 15–25.

7. A vibration sensor as recited in claim 1 wherein said magnetic biasing means for imparting magnetization to said magnetostrictive element is a permanent magnet.

8. A vibration sensor as recited in claim 1 wherein said magnetic biasing means for imparting magnetization to said magnetostrictive element is an electromagnet.

9. A vibration sensor as recited in claim 1 wherein said means for detecting changes in the magnetization of said magnetostrictive element is a coil of wire disposed in proximity to said magnetostrictive element.

10. A vibration sensor as recited in claim 1 wherein said magnetostrictive element is composed of a metal alloy that is at least 50 per cent glassy.

11. A vibration sensor as recited in claim 1, wherein said frame further comprises damping means for providing a bandwidth of frequencies with which said tuning means is mechanically resonant.

12. A vibration sensor as recited in claim 11, wherein said damping means comprises a piece of resilient material attached to said frame.

13. A vibration sensor as recited in claim 12 wherein said damping means is adapted to provide a preselected bandwidth.

14. A vibration sensor to detect vibrations having a preselected frequency comprising:
   a. tuning means mechanically resonant with a preselected vibration frequency to be detected, said tuning means comprising a frame having at least one mechanical resonant frequency and two cantilevered elements extending therefrom;
   b. a glassy metal magnetostrictive element connected between said cantilevered elements to undergo varying stress applied thereto by vibrational movements of said cantilevered elements;
   c. magnetic biasing means for imparting a magnetization to said magnetostrictive element; and
   d. means associated with said magnetostrictive element for detecting changes in the magnetization thereof due to the varying stress, applied thereto.

15. A vibration sensor as recited in claim 14 wherein said magnetostrictive element is a metal alloy that is at least 50 per cent glassy.

16. A vibration sensor as recited in claim 14, wherein said frame further comprises bandwidth means for providing a bandwidth of frequencies with which said tuning means is mechanically resonant.

17. A vibration sensor as recited in claim 16, wherein said bandwidth means comprises at least one preselected mass attached to at least one of said cantilevered elements to tune each of said cantilevered elements to a different resonant frequency.

18. A vibration sensor as recited in claim 17, wherein said bandwidth means is adapted to provide a preselected bandwidth.

19. A vibration sensor adapted for use with an internal combustion engine to detect vibrations due to engine knock, comprising:
- a. a base adapted for mounting to an internal combustion engine;
- b. a frame connected to said base and having two cantilevered element extending therefrom, said frame being mechanically resonant with said vibrations;
- c. a frequency adjusting means connected to said cantilevered element for varying the resonant frequency of said frame.
- d. a glassy metal element of positive magnetostriction material interconnected between said cantilevered elements and substantially perpendicular thereto to undergo varying tensile stress in response to resonating movements of said cantilevered elements;
- e. a magnet associated with said magnetostrictive element to impart a magnetization thereto; and
- f. a coil of electrically conductive material located in proximity to said magnetostrictive element for detecting changes in the magnetization therof caused by variations of said tensile stress.

* * * * *